United States Patent

[11] 3,609,112

[72] Inventors Herbert M. Schroeder;
 Paul C. Stievater, both of Williamsville, N.Y.
[21] Appl. No. 656,615
[22] Filed June 30, 1967
[45] Patented Sept. 28, 1971
[73] Assignee Tertron Inc.

[54] UREA-URETHANE COMPOSITIONS FROM 1-AMINO-3-AMINOMETHYL-3,5,5-TRIMETHYL CYCLOHEXANE
34 Claims, No Drawings

[52] U.S. Cl. ................................................. 260/30.2,
 260/32.6, 260/33.4 UR, 260/77.5 AM
[51] Int. Cl. ........................................................ C08g 22/00
[50] Field of Search ........................................... 260/77.5
 AM, 33.4 UR, 30.2, 32.6 N, 75 T, 75 NH

[56] References Cited
UNITED STATES PATENTS

| | | | |
|---|---|---|---|
| 2,817,643 | 12/1957 | Altner ........................ | 260/33.4 X |
| 3,383,365 | 5/1968 | Tate et al. .................. | 260/75 |
| 3,401,143 | 9/1968 | Finelli et al. ............... | 260/31.4 X |
| 3,432,456 | 3/1969 | Oertel et al. ................ | 260/30.2 |

FOREIGN PATENTS

| | | | |
|---|---|---|---|
| 1,368,070 | 6/1964 | France ........................ | 260/78 |

*Primary Examiner*—Donald E. Czaja
*Assistant Examiner*—M. J. Welsh
*Attorneys*—John W. Behringer, Eugene L. Bernard, Martin J. Brown, James N. Dresser, W. Brown Morton, Jr., John T. Roberts and Malcom L. Sutherland

ABSTRACT: A urea-urethane composition is prepared by reaction of 1-amino-3-aminomethyl-3,5,5-trimethyl cyclohexane with urethane prepolymer.

UREA-URETHANE COMPOSITIONS FROM 1-AMINO-3-AMINOMETHYL-3,5,5-TRIMETHYL CYCLOHEXANE

This invention relates to polyurethane compositions. More particularly, the invention concerns polyurethanes made from prepolymers formed from diisocyanates and aliphatic polyols. These prepolymers are reacted with 1-amino-3-aminomethyl-3, 5, 5-trimethyl cyclohexane, often in the presence of a solvent for the prepolymer and the resultant urea-urethane compositions; and upon evaporation of solvent, if present, the urea-urethanes are solid materials of exceptional properties. Thus the urea-urethanes can be formed as coatings on various substrates, as independent film or sheet materials or used in other desirable applications. The urea-urethanes prepared from aliphatic diisocyanates exhibit outstanding resistance to the degradative and yellowing action of ultraviolet light rays. The cured urea-urethanes are stable, possess excellent abrasion, strength, and elongation properties and when applied as coatings the urea-urethanes adhere firmly to various suitable substrates.

The reaction of diisocyanates and polyols to yield urethane prepolymers containing free isocyanate groups is well known. The further combination of these prepolymers with chain-extending polyfunctional materials such as diamines has also been described. Frequently, the latter reaction is fashioned to give elastomeric urea-urethanes, and it is highly desirable that such elastomers exhibit good tensile strength and elongation characteristics. Moreover, the urea-urethanes whether elastomeric or not, should also be stable, have good abrasion resistance, and when employed as coatings show acceptable adherence to various substrates.

It has been known for several years that aromatic polyurethanes which have been cured by reaction of free residual isocyanate groups in the polymer with moisture in the air, become increasingly yellow on continued exposure to sunlight. Since light from an ultraviolet lamp gives a similar effect and since sunlight contains light of wavelength in the ultraviolet range, it is apparent that the ultraviolet part of the spectrum of sunlight causes most of the yellowing. Urethanes made from aromatic diisocyanates yellow to the greatest extent, but polyurethanes made from several aliphatic diisocyanates also yellow significantly, although less, when exposed to ultraviolet light. By the present invention, we have discovered that prepolymer polyurethanes containing free isocyanate groups, said prepolymers being derived essentially from diisocyanate and one or more aliphatic polyols, can be reacted with 1-amino-3-aminomethyl-3,5,5-trimethyl cyclohexane, whose structural formula is

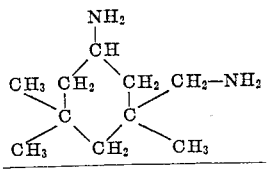

to form urea-urethane polymers having the highly desirable characteristics discussed above. The urea-urethane polymers made from aliphatic diisocyanates exhibit excellent resistance to yellowing under the influence of ultraviolet light, and at the same time the resulting urea-urethanes possess other desirable properties needed in polyurethane compositions.

Due to the high resistance of the urea-urethane polymers made from aliphatic diisocyanates and 1-amino- 3-aminomethyl-3,5,5-trimethyl cyclohexane, to the deteriorating and yellowing action of ultraviolet light we can prepare clear compositions which remain of considerably lighter color than those produced from many urea-urethanes, even those made from aliphatic diisocyanates and other diamines. Moreover, when our compositions are colored, for instance through the addition of pigments, they remain stable over prolonged periods, whereas urea-urethanes derived from other amines may darken continually on exposure to light, for example, when the urea-urethanes are stored in transparent containers. Thus, the urea-urethanes of the present invention made from aliphatic diisocyanates have potentially wider areas of use than most urea-urethanes heretofore available and our compositions can, for instance, be employed in clear or pigmented, nonyellowing wood finishes such as floor finishes and marine finishes; in other nonyellowing and nonchalking finishes; for coating chrome surfaces and various plastics such as vinyl fabrics; and for many other uses. This great potential for the compositions of our invention is further made possible since our urea-urethanes, regardless of the nature of the diisocyanate employed, have high strength and excellent abrasion resistance and hardness, do not crack or mar easily and have good substrate and intercoat adhesion properties so that when used as coatings they resist peeling and blistering upon weathering. The urea-urethane compositions can also be used, among other things, as laminants, adhesives, and elastomers.

Although diisocyanate is essential in preparing our prepolymers, minor amounts of other polyisocyanates may be present providing the compositions are not unduly deleteriously affected. In making the urethane prepolymer one or more of a variety of hydrocarbon diisocyanates can be employed. Thus, the diisocyanate may be aliphatic, aromatic or mixed aliphatic-aromatic structures. The aliphatic diisocyanates are preferred, especially when making urea-urethanes exhibiting good resistance to the yellowing effects of ultraviolet light. The aliphatic diisocyanates include those having cycloaliphatic configurations and these are conveniently obtained by hydrogenation of the corresponding aromatic and mixed aromatic-aliphatic diisocyanates. The isocyanates may be substituted with noninterfering groups such as aliphatic hydrocarbon radicals, e.g., lower alkyl groups. The hydrocarbon portion of the diisocyanate often has at least about four carbon atoms and usually does not have more than about 24 carbon atoms. Diisocyanates of about six to 20 carbon atoms in the hydrocarbon group are preferred. Suitable diisocyanates include completely hydrogenated di-(siocyanato phenyl) methane, 1-isocyanato- 3-isocyanatomethyl-3,5,5-trimethyl cyclohexane, hexamethylene diisocyanate, completely hydrogenated tolylene diisocyanate, 2,4,4-trimethylhexamethylene diisocyanate, 2,6-tolylene diisocyanate, 2,4-tolylene diisocyanate, p-phenylene diisocyanate, p,p'-diphenylmethane diisocyanate, 1,5-naphthalene diisocyanate, substituted aromatic and aliphatic diisocyanates, etc. The use of aromatic diisocyanates lowers the resistance of the urea-urethane polymers to the effects of ultraviolet light and the presence of diisocyanato dicyclohexyl methane makes the prepolymers more susceptible to gellation. German Pat. No. 1,202,785 and Belgium Pat. No. 666,023, disclose 1-isocyanato-3-isocyanatemethyl-3,5,5-trimethyl cyclohexane which can be made by phosgenation of 1-amino-3-aminomethyl-3,5,5-trimethyl cyclohexane, preparation of the latter being described in Belgium Pat. No. 621,259.

The urethane prepolymers of the invention are essentially made by reaction of diisocyanates with urethane-forming aliphatic polyols, a major weight portion of which polyol component has a molecular weight of at least about 500, and the prepolymers are often in the essentially liquid state either as the polymer per se or dissolved in a solvent. The prepolymer is generally stable in the sense that it will not cure to an insoluble solid unless further contacted with water, aliphatic polyol or other active hydrogen-containing material. These prepolymers can have a free isocyanate group content of about 1 to 15, often at least about 2 and preferably about 3 to 7, weight percent based on polymer content or solids. The prepolymer-forming reaction mixture generally contains a ratio of total isocyanate groups to total hydroxyl radicals of at least 1.2:1, often up to about 3:1 or more. The ratio of isocyanate groups to hydroxyl groups can affect the properties of the compositions, but undesirable results can be offset by using, when making the prepolymer, a polyol of appropriate molecular weight. With a given prepolymer, increases in the ratio of NCO to OH provide coatings of greater film hardness and mar resistance while flexibility and impact resistance may be adversely affected, but these effects can be modified by using a longer chain polyol.

An essential component used in making the prepolymer compositions of the present invention 15, as noted, one or more aliphatic polyols. The polyols may contain a minor amount of aliphatic polyols having a molecular weight below about 500 or phenolic polyol. The polyol is preferably composed to a major molar extent of diol including the ether diols, although triols or other polyols having greater than three hydroxyl groups as well as their mixtures with diols can be employed. The polyols, thus for the most part, have at least two hydroxyl groups attached to aliphatic carbon atoms, and may be selected from a wide variety of polyhydroxyl materials which may be aliphatic, including cycloaliphatic, hydrocarbon compounds, including substituted-hydrocarbon compounds. The polyol may often have a molecular weight of up to about 5,000 or more, but preferably has a molecular weight of about 750 to 3,000.

Among the wide variety of polyols which can be used in this invention are those represented by the formula:

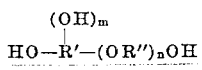

in which R' is an aliphatic hydrocarbon radical, preferably saturated, and R'' is an alkylene radical of two to four, preferably, two to three, carbon atoms, R' preferably has two to 12, advantageously two to six, carbon atoms. The letter $n$ represents a number from 0 to about 50, depending on the molecular weight desired, while the letter $m$ is 0 to 2 or more. When $n$ is other than 0, R' may often be the same as R''.

Suitable aliphatic alcohols include the polyether glycols of up to about 5,000 or more molecular weight, such as the polyethylene glycols, polypropylene glycols, and polybutylene glycols. The latter materials include the straight chain polybutylene glycols often referred to as polytetramethylene ether glycols, as well as the branched-chain polybutylene glycols, for instance, made from 1,2-and 2,3-butylene oxide and designated below in the specific examples as polybutylene glycols. There can also be employed the hydroxy-containing polymers of olefinically unsaturated monomers, especially of the dienes such as the hydroxy-terminated polybutadienes. Among the relatively low molecular weight polyols which can be present are trimethylol propane, butane diols, trimethylol ethane, 1,6-hexamethylene glycol, 1,2,6-hexanetriol, glycerol, etc.

The isocyanate-polyol prepolymers are stable and preferably in an essentially liquid state, at least when in a solvent. There is a greater tendency to produce intractable prepolymer gels when the polyol contains a cross-linking component which has at least three hydroxyl groups per molecule. The prepolymer compositions of the present invention include those in which at least a portion of the polyol reactant has at least three hydroxl groups per molecule such as those mentioned before, including the polyols of the defined formula where $m$ is 1 to 2, e.g. trimethylol propane, trimethylol ethane, 1,2,6,-hexanetriol, etc., and their alkylene-oxide derived polyethers. However, the amount or degree of functionality of the polyol should not be so great that an intractable or non-reactive prepolymer is obtained. Such cross-linking aliphatic polyols often have about three to 12, preferably about three to six, carbon atoms, although their polyethers can have molecular weights of at least about 500. When the polyol component used in making the prepolymer contains cross-linking polyol, essentially the entire polyol may have at least about three hydroxyl groups per molecule, but large amounts of such polyol or polyols of high functionality may preclude the formation of elastomers. It may be desirable to limit the hydroxyl groups supplied by the cross-linking polyol to up to about 30, preferably up to about 10, mole percent based on total hydroxy groups.

The polyurethane-type prepolymer reaction products of the present invention can be made by simultaneous reaction of excess isocyanate and polyol. Alternatively, the diisocyanate can be reacted with part or all of one or more of the polyols prior to the reaction with the remaining portion of these materials. Stepwise mixing of the diisocyanate with the polyols may be used to enhance temperature control. The reaction temperatures for making the various urethane prepolymers of the present invention are often in the range of about 40°to 150° C., with about 50° to 130° C. being preferred; and the reaction is preferably continued until there is essentially little, if any, unreacted hydroxyl functionality remaining. As noted above wide variations in the nature and amounts of the polyol or polyol mixtures used in the preparation of the compositions of this invention can be made without materially affecting the stability of the compositions.

Catalysts can be used in forming the prepolymers to accelerate the rate of reaction. Typically the catalysts can be organotin compounds, for example dibutyl tin dilaurate and stannous octoate. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed.

The prepolymers of the present invention may be prepared in the presence of solvent which is essentially inert in this system. The solvent serves to insure that the reactants are in the liquid state and the solvent permits better temperature control during the reaction by serving as a heat sink and, if desired, as a refluxing medium. Various solvents including mixtures of such materials may be employed and among the useful organic solvents are aromatic hydrocarbons, esters, ethers, keto-esters, ketones, glycol-ether-esters, chlorinated hydrocarbons, pyrrolidones, hydrogenated furans, and the like and mixtures thereof. Frequently, the solvents are volatile materials which will be removed from the composition while it cures, and in such case, there may be no need to remove any portion of the solvent from the reaction product prior to use. The amount of solvent employed may vary widely and large volumes may be uneconomic or give materials with undesirably or inconveniently low viscosity. Often about 0.01 to 6 weights of solvent, preferably about 0.03 to 3 weights of solvent, per weight of the total isocyanate and polyol in the prepolymer are used. Among the suitable normally liquid solvents are toluene, xylene, ethylbenzene, 2-ethoxyethyl acetate, 1,1,1-trichloroethane, methyl isobutyl ketone, dimethylformamide, dimethylsulfoxide, dioxane, N-methyl pyrrolidone, tetrahydrofuran, etc. and their mixtures, and it is preferred that the solvent not contain more than about 10 carbon atoms per molecule.

In preparing the urea-urethane compositions of this invention, the urethane prepolymer of diisocyanate and polyol, can be reacted with 1-amino-3-aminomethyl-3,5,5-trimethyl cyclohexane in the presence of a solvent for the prepolymer and the resulting urea-urethane, to obtain a solution of the urea-urethane in the solvent. Since the solution has no substantial free isocyanate content the urea-urethane cures to a solid at least primarily through evaporation of the solvent, for instance, after forming the solution as a film e.g. as a coating or sheet, or other article. The urea-urethane solution can be referred to as a lacquer-type vehicle.

The urea-urethane can also be made by combining the urethane prepolymer which may be in a solvent to obtain a suitable viscosity, with 1-amino-3-aminomethyl- 3,5,5-trimethyl cyclohexane and the total amount or character of the solvent being such that the urea-urethane when formed is not in solution. Since under these conditions curing of the urea-urethane gives a solid in a very short time, the combination of the prepolymer and diamine can be placed in desired form, e.g. as a film, etc., more or less immediately after the combination is made. This result can be accomplished for instance by spraying the prepolymer and diamine separately from a two-headed spray gun onto a suitable substrate.

The amounts of the urethane prepolymer and polyamine reacted and the reaction conditions are chosen so that substantially all of the isocyanate content of the prepolymer is reacted on a weight basis. Since an approximately stoichiometric amount of polyamine is used the free isocyanate content of the urea-urethane is less than about 1 weight percent based on polymer solids, and often this free isocyanate content is less than about 0.5 percent. The urea-urethane-forming reaction can be conducted at ambient temperatures and generally the reaction temperature is in the range of about 10° to 120° C. or more, preferably about 50° to 100° C. The urea-urethane-forming reaction may, if desired, be catalyzed, for instance, by the use of catalysts similar to those mentioned above with respect to the urethane prepolymer-forming reaction. When the urea-urethane solution is cured the evaporation of solvent can be facilitated by the application of elevated temperatures. The cured polymer is noncellular as distinguished from a foam.

Among the solvents which can be present during the urea-urethane-forming reaction are the various organic solvents such as aromatic hydrocarbons; oxygen-containing hydrocarbons, including alcohols, such as the lower alkanols of one to six carbon atoms, esters, ethers, glycol ether esters, ketones and amides; ring nitrogen-containing organic materials including the pyrrolidones; as well as chlorinated hydrocarbons and the like; and mixtures thereof. Solvents in which the major component by weight is dimethyl formamide or N-methyl-2-pyrrolidone have been found to be especially suitable.

The solvent may be similar to those employed in the urethane-forming reaction or different solvents may be used in each reaction, and the solvent is essentially inert in this system. Solvents present during the urea-urethane-forming reaction are relatively volatile materials which will be removed from the composition while it cures to solid form. Although the amount of solvent employed during the urea-urethane-forming reaction is conveniently that which will give a solution of application viscosity, lesser or greater amounts of solvent can be employed. Often about 1 to 10 weights of solvent per weight of the total prepolymer and polyamine are used. The urea-urethane solution is generally of suitable viscosity when the polymer solids comprise about 15 to 50 weight percent of the solution.

Specific solvents which can be employed in the urea-urethane-forming reaction often have up to about 10 carbon atoms and include those mentioned above with respect to the urethane prepolymer-forming system, with the proper attention being given to the degree of solubility exhibited by the prepolymer and the urea-urethane in a given solvent and the potential for reaction between the solvent and/or the polymer-forming materials. Thus, ethyl alcohol has been successfully used since its reactivity with the NCO of the urethane prepolymer is slower than that of the polyamine.

Although the essential and major molar proportion of polyamine used to make the urea-urethanes of this invention is 1-amino-3-aminomethyl-3,5,5-trimethyl cyclohexane a minor amount of other polyamine can be employed and can be selected from a wide variety of suitable materials. Thus, the other or minor polyamine may be aliphatic, including cycloaliphatic, aromatic or mixed aliphatic-aromatic and has at least about two amino (—$NH_2$) groups per molecule. Often such polyamine has up to about 40 or more carbon atoms, preferably about six to 15 carbon atoms, and may contain other substituents which may be reactive or nonreactive with isocyanate groups. The preferred polyamines are diamines and further, the aliphatic, including cycloaliphatic, structures are especially advantageous, particularly to preserve in the products improved resistance to the degradative and yellowing effects of ultraviolet light. Among the useful polyamines are the alkyl diamines such as ethylene diamine, propylene diamine, hexamethylene diamine, paraphenylene diamine, methylene dianiline, trimethylhexamethylene diamine, tolylene diamine, hydrogenated diphenylmethane diamine, 4,4'-methylene-bis (2-chloroaniline), N,N'-disecondary butyl-paraphenylene diamine, etc.

The urea-urethanes of this invention can be employed in any way desired to take advantage of the characteristics of the products, for instance, the urea-urethanes may be used as coatings, adhesives, laminants or flocculants or formed into relatively thick sheets or other filmlike materials. Due to the elastomeric properties of the products they may be applied and employed in a manner to take advantage of such characteristics. The film-type products generally have a thickness of up to about 100 mils or more and often the coating compositions have a thickness of up to about 10 mils. The urea-urethanes can be formed into various materials or articles of greater cross-sectional dimensions, and the solutions can be employed in the various ways known in the art for utilization of these type of materials. The compositions can contain additives to impart special properties such as plasticizers, pigments, fillers, etc., also the solid substrates bearing the coating may be specially treated materials, including flammable members impregnated with fire-resistant chemicals or coated with a sealant.

The following examples will serve to illustrate the present invention. In the technique the polyol component was initially azeotroped to remove water, and subsequently the urethane prepolymer-forming reaction as well as that producing the urea-urethane, was conducted under an inert gas atmosphere in the usual manner. Blending of the prepolymer and the amine was at room temperature in each of the examples. The precents NCO are reported on the basis of the total weight of the vehicle.

EXAMPLE I

A mixture of 1000 grams of polypropylene glycol of 1025 molecular weight and 340 grams of polypropylene glycol of 2025 molecular weight was charged to a reaction flask provided with a reflux condenser, water trap, batch thermometer, inlet for dry gaseous nitrogen, a mechanical agitator and an electrically heated glass mantle. Fifty grams of xylene were also added to the glycol mixture. The mixture was heated for 1 hour and 10 minutes to a maximum temperature of 170° C. to remove water by azeotroping it from the mixture with xylene. The temperature of the batch was then allowed to drop to 80° C. when 595 grams of completely hydrogenated di-(4-isocyanatophenyl)methane or di-(4-isocyanato cyclohexyl) methane were added under nitrogen. A slight rise in temperature of the batch indicated that an exothermic reaction occurred when the diisocyanate combined with the glycols in the mixture. The temperature was allowed to fall to 80° C. and was maintained there for 4 hours. After the batch became cool, the product had a Gardner viscosity of Z1—1/2, Gardner color of 1 minus, a free isocyanate percent (NCO) of 5.73 and a total solid content of 100 percent.

EXAMPLE II

A vehicle was prepared by mixing 10 grams of the vehicle whose preparation is discussed in example I with 33 grams of N-methyl-2-pyrrolidone and 1 ml. of 1-amino-3-aminomethyl-3,5,5-trimethyl cyclohexane. The lacquer vehicle thereby formed had a total solids content of 23.3 percent and a Gardner viscosity of Z—1/4. The vehicle was poured into a teflon-lined pan and cured 24 minutes at 150° F., 8 minutes at 180° F. in a forced-draft oven and 72 minutes at 150° F. The cured sheet was removed from the pan and had a thickness of about 30 mils. Two test specimens cut from this sheet showed tensile strengths of 3,700 and 3,900 p.s.i. and elongations of 580 and 510 percents, respectively.

EXAMPLE III

A mixture of 900 grams of polytetramethylene ether glycol of 1,020 molecular weight, 412 grams of polytetramethylene ether glycol of 2,100 molecular weight and 50 grams of xylene was charged to a reaction flask provided with a reflux condenser, thermometer, nitrogen inlet tube, a stirrer, a Dean Stark water trap and an electrically heated glass mantle. The mixture was heated under azeotropic distillation conditions at 226° C. for 1 —hour. The mixture was then cooled to 80° C. and 536 grams of completely hydrogenated di(4-isocyanatophenyl) methane were added under nitrogen. The temperature of the batch was then maintained at 80° C. for 4 hours. After cooling, the product analyzed 95.7 percent nonvolatile material, Gardner color 1 minus, Gardner viscosity Z8+1/4 and free isocyanate (NCO) 4.09 percent.

One hundred grams of this prepolymer was dissolved in 600 grams of dimethyl formamide and placed in a Waring Blender. While the solution was stirring, 8.28 grams of 1-amino-3-aminomethyl-3,5,5-trimethyl cyclohexane were added. This mixture was stirred for 5 minutes until the solution became homogeneous. An exothermic reaction took place and after cooling the lacquer vehicle thereby formed analyzed 14.9 percent nonvolatile material, free isocyanate (NCO) 0.01 percent, Gardner color 1 minus and Gardner viscosity Z3+1/8. This lacquer was then poured into a Teflon-coated pan and cured for 20 hours at 140° F. and then 3 days at 77° F. and 50 percent relative humidity. The sheet removed from the pan had an approximate thickness of 36 mils. Two test specimens of the sheet showed tensile strengths of 5,588 and 5,118 p.s.i. and elongations of 470 and 490 percent, respectively.

EXAMPLE IV

A mixture of 450 grams of polyethylene glycol of 1,000 molecular weight, 153 grams of polyethylene glycol of 1,540 molecular weight and 25 grams of xylene was charged to a reaction flask provided with a reflux condenser, thermometer, nitrogen inlet tube, a stirrer, a Dean Stark water trap and an electrically heated glass mantle. The mixture was heated under azeotropic distillation conditions at 213° C. for 1 hour. The mixture was then cooled to 80° C. and 268 grams of completely hydrogenated di-(4-isocyanatophenyl) methane were added under nitrogen. The batch temperature was maintained at 80° C. for 4 hours and after cooling, the prepolymer analyzed 97.4 percent nonvolatile material, Gardner color 1 minus, free isocyanate (NCO) 4.13 percent. The prepolymer product was solid at room temperature.

One hundred grams of this prepolymer were dissolved in 326 grams of N-methyl-2-pyrrolidone and placed in a Waring Blender. While the solution was stirring, 8.36 grams of 1-amino-3-aminomethyl-3,5,5-trimethyl cyclohexane were added and the mixture stirred for 5 minutes until the solution was homogeneous. An exothermic reaction took place. After cooling the vehicle analyzed 24.7 percent nonvolatile material, free isocyanate (NCO) 0.03 percent, Gardner color 1 minus and Gardner viscosity Z. The lacquer thereby formed was then poured into a Teflon-coated pan and cured for 24 hours at 140° F. and allowed to remain for 3 days at 77° F. and 50 percent relative humidity. The sheet from the pan had an approximate thickness of 52 mils. Three test samples of the sheet showed tensile strengths of 788, 720 and 722 p.s.i. and elongations of 900, 770, and 865 percent, respectively.

EXAMPLE V

A mixture of 450 grams of polybutylene glycol of 1,000 molecular weight, 153 grams of polybutylene glycol of 1,500 molecular weight and 45 grams of xylene was charged to a reaction flask provided with a reflux condenser, thermometer, nitrogen inlet tube, a stirrer, a Dean Stark water trap and an electrically heated glass mantle. The mixture was heated under azeotropic distillation conditions at 234° C. for 1 hour, was cooled to 80° C. and 268 grams of completely hydrogenated di-(4-isocyanatophenyl) methane were added under nitrogen. The temperature of the batch was maintained at 80° C. for 5 1/2 hours. After cooling the resulting prepolymer analyzed 95.5 percent nonvolatile material, Gardner color 1 minus, free isocyanate (NCO) 4.51 percent and Gardner viscosity Z6.

One hundred grams of the prepolymer were dissolved in 310 —grams of dimethyl formamide and placed in a Waring Blender. While the solution was stirring, 9.14 grams of 1-amino-3-aminomethyl-3,5,5-trimethyl cyclohexane were added. The mixture was stirred for 5 minutes until the solution became homogeneous. An exothermic reaction occurred. After cooling the lacquer thereby formed analyzed 24.5 percent nonvolatile material, free isocyanate (NCO) zero percent, Gardner color 1 minus and Gardner viscosity D. The lacquer was then poured into a Teflon-coated pan and cured for 24 hours at 140° F. and 3 days at 77° F. and 50 percent relative humidity. The sheet formed had an approximate thickness of 58 mils. Two test specimens of the sheet showed tensile strengths of 1,213 and 1,311 p.s.i. and elongations of 340 percent, respectively.

EXAMPLE VI

A mixture of 450 grams of polytetramethylene ether glycol of 1,020 molecular weight, 206 grams of polytetramethylene glycol of 2,100 molecular weight and 43 grams of xylene was charged to a reaction flask provided with a reflux condenser, thermometer, nitrogen inlet tube, a motor-driven stirrer, a Dean Stark water trap and an electrically heated glass mantle. The mixture was heated under azeotropic distillation conditions at 226° C. for 1 hour in order to dry it. The mixture was then cooled to 50° C. and 226 grams of 1-isocyanato-3-isocyanatomethyl1-3,5,5-trimethyl cyclohexane were added under nitrogen. The temperature of the mixture was maintained at 80° C. for 5 hours. After cooling the prepolymer thereby formed analyzed 94.2 percent nonvolatile material, Gardner color 1 minus, Gardner viscosity Z6+1½ and free isocyanate (NCO) 4.38 percent.

One hundred grams of prepolymer were dissolved in 303 grams of dimethyl formamide and put into a Waring Blender. While the solution was stirring 8.85 grams of 1-amino-3-aminomethyl-3,5,5-trimethyl cyclohexane were added. The mixture was stirred for 5 minutes until it became homogenous. An exothermic reaction took place. After cooling the vehicle analyzed 25.5 percent nonvolatile material free isocyanate (NCO) 0.04 percent, Gardner color 1 minus and Gardner viscosity z3+1/8 . This lacquer vehicle was poured into a Teflon-coated pan and cured 3 days at 140° F., then 5 days at 77° F. and 50 percent relative humidity. The cured sheet had an approximate thickness of 56 mils. Three test specimens cut from this sheet showed tensile strengths of 3,467, 3,714 and 3,571 p.s.i. and elongations of 585, 620, and 580 percents, respectively.

Three-mil and 6-mil films of the lacquer were formed and the wet films were dusted with 1/16 inch Rayon fiber in excess. The films were inverted and the loose fiber shaken off. The films were dried 24 hours at room temperature and observed. A desirable floc appearance was noted. This illustrated the desirable adhesive character of this vehicle for floc use.

Two pieces of redwood were glued together with the lacquer by coating them with a brush and clamping the pieces together. The combined pieces were allowed to dry at room temperature for 16 hours after which the bond could not be pulled apart by hand for a area of about 3 1/2 square inches. Suitable test pieces were sawed from the larger test piece and were broken in an Instron tensile tester. The shear strength of the bond was found to be 158.5 p.s.i. The adhesion test used was a method for testing rubber cements ASTM D816-55 (1965) Method B, Adhesions Strength in Shear. The area was 1 square inch and the pull speed 2 inches per minute.

EXAMPLE VII

A mixture of 1,000 grams of polypropylene glycol of 1,025 molecular weight, 340 grams of polypropylene glycol of 2,025 molecular weight and 75 grams of xylene was charged to a glass, three-neck flask equipped with a reflux condenser, a Dean Stark water trap, thermometer, stirrer, an electrically heated glass mantle and a nitrogen inlet tube. The mixture was heated under azeotropic distillation conditions at 245°-249° C. for 1 hour and cooled to 30° C. Five hundred four grams of 1-isocyanato-3-isocyanatomethyl-3,5,5-trimethyl cyclohexane were added to this mixture under nitrogen and no noticeable exotherm occurred. The mixture was heated to 80° C. and held at 80°–85° C. for 9 hours. After cooling the prepolymer thereby formed analyzed 90.3 percent nonvolatile material, Gardner color 1 minus, Gardner viscosity Z–1½ and free isocyanate (NCO) 5.16 percent.

One hundred grams of the prepolymer and 390 grams of dimethyl formamide were mixed in a Waring Blender. Ten and four tenths grams of 1-amino-3-aminomethyl-3,5,5-trimethyl cyclohexane were added and blended in for 5 minutes. The lacquer vehicle formed analyzed 21.1 percent nonvolatile, Gardner color 1 minus, Gardner viscosity A and free isocyanate (NCO) 0.0 percent. Eight fluid ounces of the lacquer were poured into a Teflon-coated pan and cured at 140° F. for 24 hours and then at 77° F. and 50 percent humidity for 3 days. The approximate thickness of the sheet formed was 60 mils. The tensile strength of two test pieces of the sheet were 1,396 and 1,229 p.s.i. with elongations of 620 and 630 percent, respectively. After a 5-hour exposure under a 400-watt ultraviolet lamp at 18 inches distance, there was a very slight yellowing of the sheet showing the excellent resistance of this polyurethane composition to exposure to ultraviolet light.

EXAMPLE VIII

A mixture of 500 grams of polypropylene glycol of 1025 molecular weight, and 50 grams of xylene was charged to a glass, three-neck reaction flask equipped with a reflux condenser, a Dean Stark water trap, thermometer, motor-driven stirrer, an electrically heated glass mantle and a nitrogen inlet tube. The mixture was heated under azeotropic distillation conditions at 230° C. for 1 hour and 10 minutes in order to dry it. The mixture was next cooled to 26° C. and 191 grams of hexamethylene-1,6-diisocyanate were added under nitrogen. No noticeable exotherm occurred. The mixture was then heated to 80° C. and held at 80°–83° C. for 30 hours. After cooling, the prepolymer mixture thereby formed analyzed 93.6 percent nonvolatile material, Gardner color 1 minus, Gardner viscosity Z—2 and free isocyanate (NCO) 5.14 percent.

One hundred grams of prepolymer were mixed with 322 grams of N-methyl-2-pyrrolidone in a Waring Blender. Ten and four tenths grams of 1-amino-3-aminomethyl-3,5,5-trimethyl cyclohexane were added to the mixture and blended in for 5 minutes. The resulting lacquer mixture analyzed 26.5 percent nonvolatile, free isocyanate (NCO) 0.0 percent Gardner color 1 minus and Gardner viscosity N+3/4 . Eight fluid ounces of this lacquer were poured into a Teflon-coated pan and cured for 24 hours at 140° F. and then 3 days at 77° F. and 50 percent humidity. The approximate thickness of the sheet was 73 —mils, its tensile strength was 165 p.s.i. and its elongation was 1210 percent. After 5 hours of exposure under a 400-watt mercury vapor ultraviolet lamp at 18 inches distance there was no noticeable yellowing of the sheet.

EXAMPLE IX

A mixture of 500 grams of polypropylene glycol of 1025 molecular weight, 170 grams of polypropylene glycol of 2025 molecular weight and 50 grams of xylene was charged to a glass, three-neck flask equipped with a reflux condenser. a dean Stark water trap, thermometer, stirrer, an electrically heated glass mantle and a nitrogen inlet tube. The mixture was distilled under azeotropic conditions at 225°–227° C. for 1 hour and was cooled to 50° C. Two hundred two grams of completely hydrogenated tolylene diisocyanate or methyl cyclohexyl diisocyanate were next added under nitrogen. No noticeable exotherm occurred. The mixture was then heated to 80° C. and held at 80°–83° C. for 18 hours. After cooling the prepolymer thereby formed analyzed 90.3 percent nonvolatile, Gardner color 2, Gardner viscosity Z–2 and free isocyanate (NCO) 5.09 percent One hundred grams of the prepolymer were mixed with 319 grams of N-methyl-2-pyrrolidone in a Waring Blender. Ten and three-tenths grams of 1-amino-3-aminomethyl-3,5,5-trimethyl cyclohexane were added and blended in for five minutes. The resulting lacquer analyzed 26.6 percent nonvolatile material, Gardner color 1 minus, Gardner viscosity K and free isocyanate (NCO) 0.0 percent. Eight fluid ounces of the lacquer were poured into a Teflon-lined pan and cured at 140° F. for 24 hours. The product was kept at 77° F. and 50 percent humidity for 3 days. The average thickness of the sheet was 56 mils. Tensile strengths of two test pieces of the sheet were 303 and 289 p.s.i. and their elongations were 390 and 520 percent, respectively. After 5 hours exposure under a 400-watt ultraviolet lamp at 18 inches distance, there was no noticeable yellowing of the sheet. Similar polyurethanes prepared using aromatic diisocyanates yellow to a great extent when exposed to ultraviolet under the same conditions.

EXAMPLE X

A mixture of 500 grams of polypropylene glycol of 1025 molecular weight, 170 grams of polypropylene glycol of 2025 molecular weight and 50 grams of xylene was charged to a glass, three-neck reaction flask equipped with a reflux condenser, a Dean Stark water trap, thermometer, stirrer, an electrically heated glass mantle and a nitrogen inlet tube. The mixture was subjected to azeotropic distillation conditions at 225°–228°C. for 1 hour and then cooled to 50° C. Two hundred thirty eight grams of 2,4,4-trimethyl hexamethylene-1,6-diisocyanate were added to the mixture under nitrogen. No noticeable exotherm occurred. The mixture was heated to 80° C. and held at 80°–83° C. for 12 hours. After cooling the prepolymer thereby formed analyzed 90 percent nonvolatile material, Gardner color 1. Gardner viscosity z-2 —2½ and free isocyanate (NCO) 4.83 percent.

One hundred grams of the prepolymer and 319 grams of N-methyl-2-pyrrolidone were mixed in a Waring Blender. Nine and eight-tenths grams of 1-amino-3-aminomethyl-3,5,5-trimethyl cyclohexane were added and blended in for 5 minutes; The resulting lacquer analyzed 26.1 percent nonvolatile material, Gardner color 1 minus, Gardner viscosity G and free isocyanate (NCO) 0.0 percent. Eight fluid ounces of lacquer were poured into a Teflon-lined pan and cured at 140° CF. for 24 hours and then at 77° F. and 50 percent humidity for 3 days. The approximate film thickness of the sheet was 60 mils. After 5 hours exposure under a 400-watt ultraviolet lamp at 18 inches distance there was no noticeable yellowing of the sheet, showing superior resistance to ultraviolet exposure as compared with similar polyurethanes prepared from aromatic diisocyanates.

EXAMPLE XI

A solution of 4.5 grams of 1-amino-3-aminomethyl-3,5,5-trimethyl cyclohexane and 163.5 grams of reagent grade ethyl alcohol was added to 50 grams of the prepolymer whose preparation is described in example I. This mixture was agitated approximately 2–3 minutes on a paint shaker while a slight exotherm developed. The resultant lacquer was formulated to contain 25 percent nonvolatile material and had a Gardner-Holdt Viscosity of Z–1/2. This lacquer was then poured into a Teflon-coated pan and cured for 72 hours at 77° F. and 50 percent relatively humidity. The resultant sheet from the pan had an approximate film thickness of 12 mils. Four test specimens cut from the sheet showed tensile strengths of 5075, 4567, 5743, and 4850 p.s.i. while having corresponding elongations of 525, 510, 540, 540 percent, respectively.

EXAMPLE XII

A prepolymer was prepared in the manner usually used for making polyurethane prepolymers and described in the foregoing examples. The prepolymer was made from 57.5 percent polypropylene glycol of average molecular weight 1025 19.6 percent polypropylene glycol of average molecular weight 2025 and 22.8 percent 80/20 tolylene diisocyanate.

This prepolymer had a viscosity of 80 stokes a nonvolatile content of 97.5, a Gardner color of 1 minus and a percent free diisocyanate (NCO) of 5.55.

A solution of 5.6 grams of 1-amino-3-aminomethyl-3,5,5-trimethyl cyclohexane and 166.4 grams of reagent-grade ethyl alcohol was added to 50 grams of the prepolymer and agitated for approximately 5 minutes on a paint shaker. A slight exotherm was noted. The resultant lacquer was formulated to contain 25 percent nonvolatile material and had a Gardner-Holdt viscosity of Y−1/2. This lacquer was then poured into a Teflon-coated pan and cured 67 hours at 77° F. and 50 percent relative humidity. The resultant sheet from the pan had an approximate film thickness of 21 mils. Three test specimens of the sheet showed tensile strengths of 4360, 5657, and 6782 p.s.i. while having corresponding elongations of 520, 560, and 600 percent, respectively.

The film-forming characteristics of the various lacquer vehicles were also studied. Thus a 3-mil wet film of the vehicle of example III was cast on glass and on a Morest chart and found to dry at room temperature in three-fourths of an hour. The resulting dry film was opaque, mar resistant and had a Sward hardness of 14 after 3 days. When exposed to a 400-watt ultraviolet mercury arc lamp at a distance of 18 inches for 4 hours, the film showed no yellowing. Similarly, when a 3-mil wet film of the lacquer vehicle of example IV was cast on glass and on a Morest chart drying occurred in one-half an hour. The dry film marred slightly, was glossy and gave a Sward hardness value of 10 after 3 days. When the film was exposed to the same ultraviolet lamp under the same conditions no yellowing occurred.

A 3-mil wet film of the lacquer vehicle of example V was cast on both glass and on a Morest chart. The film dried in three-fourths of an hour to a moderately glossy surface with a Sward hardness of 12 after 3 days. When exposed to the ultraviolet lamp under the conditions used to evaluate the film from the vehicle of example III, very slight yellowing was observed. Also a 3-mil wet film of the lacquer vehicle of example VI was cast on both a Morest chart and on a glass plate. The film dried in one-half hour, showed good resistance to mar, was moderately glossy on the Morest chart, more glossy on the glass plate, had a Sward hardness of 10 after 3 days. and when exposed to the ultraviolet light test, no yellowing occurred. Using the same test the film properties of the lacquer vehicles of examples VII through X were determined after drying from 2 to 6 hours and soft films showing excellent resistance to ultraviolet light were obtained.

EXAMPLE XIII

A vehicle was prepared by adding to 50 grams of the prepolymer whose preparation was discussed in example I, a mixture of 4.5 grams of 1-amino-3-aminomethyl-3,5,5-trimethyl cyclohexane and 163.5 grams of isopropyl alcohol, followed immediately by vigorous agitation for 5 minutes.

This vehicle had a calculated percent solids of 25, and a Gardner-Holdt viscosity of K−1/4.

This vehicle was poured into a Teflon-lined pan and dried for 113 hours at 77° F. and 50 percent relative humidity, and 2 1/2 hours at 150° F. The resultant film had a thickness of 30 to 45 mils. Two test specimens cut from this film had tensile strengths of 2100 and 1182 p.s.i. and elongations of 585 and 490 percents, respectively.

It is claimed:

1. A urea-urethane composition prepared by reaction of a substantially stoichiometric amount of polyamine consisting essentially of 1-amino-3-aminomethyl-3,5,5-trimethyl cyclohexane with urethane prepolymer prepared by reaction of hydrocarbon diisocyanate and aliphatic polyether glycol having a molecular weight of at least about 500, said urethane prepolymer having a free isocyanate content of about 1 to 15 weight percent based on urethane solids.

2. The composition of claim 1 in which the urea-urethane is dissolved in inert solvent.

3. The composition of claim 2 in which the polyether glycol has a molecular weight of up to about 5000.

4. The composition of claim 1 in which the diisocyanate is aliphatic diisocyanate.

5. The composition of claim 4 in which the urea-urethane is dissolved in inert solvent.

6. The composition of claim 5 in which the polyether glycol has a molecular weight of up to about 5000.

7. The composition of claim 5 in which polyether glycol is selected from the group consisting of polypropylene glycol, polyethylene glycol and polybutylene glycol.

8. The composition of claim 7 in which the free isocyanate group content of the urethane prepolymer is about 3 to 7 weight percent.

9. The composition of claim 6 in which the diisocyanate is selected from the group consisting of di-(isocyanatocyclohexyl) methane, hexamethylene diisocyanate, methyl cyclohexyl diisocyanate and 2,4,4-trimethyl hexamethylene diisocyanate.

10. The composition of claim 9 in which the polyether glycol is selected from the group consisting of polypropylene glycol, polyethylene glycol and polybutylene glycol.

11. The composition of claim 10 in which the urethane prepolymer has a free isocyanate group content of about 3 to 7 weight percent.

12. A cured film of the composition of claim 1.
13. A cured film of the composition of claim 3.
14. A cured film of the composition of claim 4.
15. A cured film of the composition of claim 6.
16. A cured film of the composition of claim 7.
17. A cured film of the composition of claim 8.
18. A cured film of the composition of claim 9.
19. A cured film of the composition of claim 10.
20. A cured film of the composition of claim 11.

21. The composition of claim 1 in which the urea-urethane is dissolved in lower alkanol of one to six carbon atoms.

22. The composition of claim 21 in which the diisocyanate is aliphatic diisocyanate.

23. The composition of claim 22 in which the lower alkanol is isopropyl alcohol.

24. The composition of claim 7 in which the solvent is selected from the group consisting of dimethylformamide, N-methyl-2-pyrrolidone and alkanol of one to six carbon atoms.

25. The composition of claim 24 in which the solvent is alkanol of one to six carbon atoms.

26. The composition of claim 25 in which the solvent is isopropanol.

27. The composition of claim 25 in which the diisocyanate is selected from the group consisting of di-(isocyanatocyclohexyl) methane, hexamethylene diisocyanate, methyl cyclohexyl diisocyanate and 2,4,4-trimethyl hexamethylene diisocyanate.

28. The composition of claim 27 in which the solvent is isopropanol.

29. The composition of claim 1 in which the urea-urethane is dissolved in a solvent consisting essentially of isopropyl alcohol.

30. The composition of claim 2 in which the diisocyanate is di-(isocyanatocyclohexyl) methane.

31. The composition of claim 30 in which the solvent consists essentially of isopropyl alcohol.

32. The composition of claim 31 in which the polyether glycol is selected from the group consisting of polypropylene glycol, polyethylene glycol and polybutylene glycol.

33. A cured film of the composition of claim 30.
34. A cured film of the composition of claim 32.

UNITED STATES PATENT OFFICE
CERTIFICATE OF CORRECTION

Patent No. 3,609,112                  Dated September 28, 1971

Inventor(s) Paul C. Stievater and Herbert M. Schroeder

It is certified that error appears in the above-identified patent and that said Letters Patent are hereby corrected as shown below:

Column 2, Line 37: "di-(siocyanato" should be --di-(isocyanato--.

Column 3, line 4:   "15" should be --is--.

Column 9, Line 27: after the word weight insert --170 grams of polypropylene glycol of 2025 molecular weight--.

Column 9, Line 38: "93.6" should read --93.9--.

Column 10, Line 43: after "140°" insert --F--.

Column 10, line 44, cancel "CF."

Signed and sealed this 13th day of June 1972.

(SEAL)
Attest:

EDWARD M. FLETCHER, JR.                ROBERT GOTTSCHALK
Attesting Officer                        Commissioner of Patents